United States Patent [19]

Mark

[11] 4,104,253

[45] Aug. 1, 1978

[54] FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 733,017

[22] Filed: Oct. 15, 1976

[51] Int. Cl.$^2$ .................................................. C08K 5/42
[52] U.S. Cl. ........................ 260/45.8 RW; 260/45.7 S; 260/45.8 A; 260/45.8 N; 260/45.9 NC; 260/45.95 G
[58] Field of Search ............... 260/45.7 S, 45.8 RW, 260/45.8 A, 45.8 N, 45.9 NC, 45.95 G

[56] References Cited

U.S. PATENT DOCUMENTS

| | | | |
|---|---|---|---|
| 3,775,367 | 11/1973 | Nouvertné | 260/45.9 R |
| 3,909,490 | 9/1975 | Mark | 260/45.7 S |
| 3,917,559 | 11/1975 | Mark | 260/45.7 S |
| 3,926,908 | 12/1975 | Mark | 260/45.7 S |
| 3,933,734 | 1/1976 | Mark et al. | 260/45.7 S |
| 3,948,851 | 4/1976 | Mark | 260/45.7 S |
| 3,951,910 | 4/1976 | Mark | 260/45.9 NC |
| 3,953,396 | 4/1976 | Mark | 260/45.8 A |

*Primary Examiner*—V. P. Hoke
*Attorney, Agent, or Firm*—Salvatore C. Mitri; William F. Mufatti

[57] ABSTRACT

An improved flame retardant polycarbonate composition of an aromatic carbonate polymer in admixture with an organic alkali metal salt or an organic alkaline earth metal salt or mixtures thereof, which composition has in admixture therewith halogenated organic alkali metal salts or organic alkaline earth metal salts or mixtures thereof.

10 Claims, No Drawings

FLAME RETARDANT POLYCARBONATE COMPOSITION

This invention is directed to an improved flame retardant polycarbonate composition of an aromatic carbonate polymer in admixture with an organic alkali metal salt or an organic alkaline earth metal salt or mixtures thereof, the improvement which comprises having in admixture with said polycarbonate an additive which is the halogenated metal salt of an organic alkali metal salt or an organic alkaline earth metal salt or mixtures thereof.

BACKGROUND OF THE INVENTION

With the increasing concern for safety, there is a positive move towards providing safe materials for public and household use. One particular area of need is that of providing flame resistant or flame retardand products for use by the ultimate consumer. As a result of this demand, many products are being required to meet certain flame retardant criteria both by local and federal government and the manufactures of such products. One particular set of conditions employed as a measuring standard for flame retardancy is set forth in Underwriter's Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has been surprisingly discovered that the flame retardancy of an aromatic polycarbonate composition containing certain additives which are selected from organic alkali metal salts or organic alkaline earth metal salts can be improved by the coaddition of halogenated additives which are selected from organic alkali metal salts or organic alkaline earth metal salts or mixtures thereof.

The combination of the organic salt and halogenated organic salt not only results in improved flame retardancy but allows the use of even lower concentrations of each of the salts than is possible in the individual formulations. The fact that the effect of the combined salts on flame retardancy is larger than the sum of the two separate salts suggests a synergistic interaction. The flame retardancy of organic alkali metal salts and organic alkaline earth metal salts containing no-halogen substituents or low halogen substitutents being greatly enhanced by the addition of particular halogenated organic alkali metal and organic alkaline earth metal salts.

The organic alkali metal salts and alkaline earth metal salts are selected from the group consisting of:

alkali metal salt and alkaline earth metal salts of monomeric or polymeric aromatic sulfonic acid;

alkali metal salts and alkaline earth metal salts of monomeric or polymeric aromatic sulfone sulfonic acid;

alkali metal salts and alkaline earth metal salts of unsubstituted sulfonic acids of aromatic ketones;

alkali metal salts and alkaline earth metal salts of sulfonic acids of aromatic sulfides;

alkali metal salts and alkaline earth metal salts of either monomeric or polymeric aromatic ether sulfonic acids;

alkali metal salts and alkaline earth metal salts of either monomeric or polymeric aromatic amide sulfonic acids; and mixtures of these salts.

These salts are either non-halogenated or contain small amounts of halogen as substituents. These organic alkali metal and alkaline earth metal salts are fully described as follows:

U.S. Pat. No. 3,933,734 (A) issued on Jan. 20, 1976, titled Flame Retardant Polycarbonate Composition, discloses a flame retardant polycarbonate composition of an aromatic carbonate polymer containing in admixture therewith, an additive which is the metal salt of either the monomeric or polymeric aromatic sulfonic acids or mixtures thereof.

U.S. Pat. No. 3,948,851 (B) issued on Apr. 6, 1976, titled Flame Retardant Polycarbonate Composition, discloses a flame retardant polycarbonate composition of an aromatic carbonate polymer containing in admixture therewith, an additive which is the metal salt of either the monomeric or polymeric aromatic sulfone sulfonic acids or mixtures thereof.

U.S. Pat. No. 3,926,908 (C) issued on Dec. 16, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic ketones and mixtures thereof.

U.S. Pat. No. 3,909,490 (D) issued Sept. 30, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic sulfides and mixtures thereof.

U.S. Pat. No. 3,953,396 (E) issued Apr. 27, 1976, titled Flame Retardant Polycarbonate Composition, dislcoses a flame retardant polycarbonate composition of an aromatic carbonate polymer containing in admixture therewith, an additive which is the metal of either the substituted or unsubstituted sulfonic acid of an aromatic ether.

U.S. Pat. No. 3,951,910 (F) issued Apr. 2, 1976, titled A Flame Retardant Polycarbonate Composition, discloses a flame retardant polycarbonate composition of an aromatic carbonate polymer containing in admixture therewith, a metal salt of either the monomeric or polymeric substituted and unsubstituted aromatic amide sulfonic acid or mixtures thereof.

Patents (A) through (F) are incorporated herein by reference. The metal salts of any of these patents, as well as mixtures of any of the metal salts of any of the patents, may be used therein.

These organic alkali metal salts and alkaline earth metal salts are used in amounts of from 0.01 to about 5.0 parts per hundred parts of the aromatic carbonate polymer.

The preferred organic alkali metal and alkaline earth metal salts includes sodium benzenesulfonate; potassium benzenesulfonate; sodium naphthalene-1-sulfonate; sodium diphenylether-4-sulfonate; sodium diphenylsulfone-3-sulfonate; potassium naphthalene-2-sulfonate; sodium toluene-4-sulfonate; dipotassium diphenylsulfone-3,3'-disulfonate; calcium biphenyl-4-sulfonate; polysodium polystyrene sulfonate; sodium diphenylsulfide-4-sulfonate.

The halogenated alkali metal salts and alkaline earth metal salts are selected from the group consisting of:

alkali metal and alkaline earth metal salts of either halogenated monomeric and polymeric unsaturated or substituted aromatic sulfonic acids;

alkali metal and alkaline earth metal salts of halogenated substituted and unsubstituted sulfonic acids of heterocyclic compounds wherein the heterocyclic compound is selected from the group consisting of five and six membered heterocyclic nuclei containing a hetero atom selected from the group consisting of nitrogen, oxygen and sulfur;

alkali metal and alkaline earth metal salts of halogenated halocycloaliphatic aromatic sulfonic acids;

alkali metal and alkaline earth metal salts of halogenated methanesulfonic acids;

alkali metal and alkaline earth metal salts of halogenated non-aromatic carboxylic acids.

The substituted salts are substituted by electron withdrawing radicals. The electron withdrawing radicals are the halo-, nitro-, trihalomethyl- and cyano- electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185-186), and *Physical Organic Chemistry* by Jack Hine, McGraw-Hill Book Company, Inc. 1962 (pages 5, 32 and 85-93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

However, whether the salts are substitued or unsubstituted, they are halogenated.

These halogenated organic alkali metal salts and alkaline earth metal salts are fully described as follows:

U.S. Pat. No. 3,940,366 (G), issued on Feb. 24, 1976, titled Flame Retardant Polycarbonate Composition, discloses a flame retardant polycarbonate composition of an aromatic carbonate polymer containing in admixture therewith, an additive which is the metal salt of either the monomeric or polymeric substituted aromatic sulfonic acid or mixtures thereof.

U.S. Pat. No. 3,919,167 (H) issued on Nov. 11, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acid of heterocyclic compounds and mixtures of these.

U.S. Pat. No. 3,917,559 (I) issued on Nov. 4, 1975, titled Flame Retardant Polycarbonate Composition, discloses a flame retardant polycarbonate composition of an aromatic carbonate polymer containing in admixture therewith, an additive which is the metal salt of a halocycloaliphatic aromatic sulfonic acid and mixtures of these.

Application of Victor Mark (J), Ser. No. 429,125, filed Dec. 28, 1973, now abandoned; and assigned to the same assignee as the present invention and titled, A Flame Retardant Polycarbonate Composition. This application discloses a flame retardant polycarbonate composition of an aromatic carbonate polymer containing in admixture therewith, an additive which is the metal salt of a halogenated methanesulfonic acid and mixtures thereof.

Application of Victor Mark (K), Ser. No. 429,644, filed Dec. 28, 1973 and assigned to the same assignee as the present invention and titled A Flame Retardant Polycarbonate Composition. This application discloses a flame retardant polycarbonate composition of an aromatic carbonate polymer containing in admixture therewith, an additive which is the metal salt of a halogenated non-aromatic carboxylic acid and mixtures of these.

Patents and applications (G) through (K) are incorporated herein by reference. The metal salts of any of these patents, as well as mixtures of any of the metal salts of any of these patents and applications, may be used therein.

These halogenated organic alkali metal salts and organic alkaline earth metal salts are used in amounts of from 0.01 to about 5.0 parts per hundred parts of the aromatic carbonate polymer.

The preferred halogenated alkali metal salts and alkaline earth metal salts include sodium pentachlorobenzene sulfonate; potassium 2,4,5-trichlorobenzene sulfonate; sodium 2,4,5-trichlorobenzene sulfonate; potassium 4-bromobenzene sulfonate; potassium trifluoromethane sulfonate; sodium 5-chlorothiophene-2-sulfonate; sodium 2,3,4,5-pentachloro-diphenyl-sulfide-4'-sulfonate; sodium p-iodobenzene sulfonate; polypotassium (4-chlorostyrene)-poly-3-sulfonate.

In the practice of this invention, the aromatic polycarbonates that can be employed herein are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl)-propane, 2,2-(3,5,3',5'-tetrabromo-4,4'-dihydroxydiphenyl)propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. There are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, trietylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bispenol-A with phosgene. Suitable catalysts include tertiary amine such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide tetramethylammonium chloride, tetramethyl ammonium hydroxide, tetra-n-butyl ammonium iodide, benzyltrimethyl ammonium chloride and quaternary phosphonium compounds such as, for example, n-butyl-triphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are caboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid- or their haloformyl derivatites.

Also, included therein are blends of a linear polycarbonate and a branched polycarbonate.

Obviously, other materials can also be employed with the aromatic carbonate polymer of this invention and include such materials as anti-static agents, pigments, mold release agents, thermal stabilizers, ultraviolet stabilizers, reinforcing fillers and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred (100) parts of an aromatic polycarbonate, prepared by reacting 2,2-bis(4-hydroxyphenyl) propane and phosgene in the presence of an acid acceptor and a molecular weight regulator and having an intrinsic viscosity of 0.57 is mixed with the amounts of the additives listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by about ⅛–1/8 in. thick into test squares of about 2 in. by 2 in. by about 1/8 in. thick. The test bars (5 for each additive listed in the Table) are subject to the test procedure set forth in Underwriters' Laboratories, Inc. Bulletin UL-94, Burning test for classifying Materials. In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛ in. of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton. In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

The results of the different additives within the scope of the instant invention are as follows with a control being the aromatic polycarbonate as prepared above without the additive of the type set forth herein.

TABLE 1

| Sample | Organic Salt Additive I | Amount (Parts per Hundred) | Organic Salt Additive II | Amount (Parts per Hundred) | Flame Out Time Sec. | No. of Drips Per five Test bars | UL-94 Rating |
|---|---|---|---|---|---|---|---|
| Control | — | — | — | — | 26 | 13 | Burning |
| A | Sodium benzenesulfonate | 0.2 | — | — | 4.2 | 4 | V-II |
| B | — | — | Sodium pentachlorobenzene sulfonate | 0.2 | 3.8 | 5 | V-II |
| C | Sodium benzenesulfonate | 0.1 | Sodium pentachlorobenzene sulfonate | 0.1 | 4.2 | 0 | V-O |
| D | Potassium benzenesulfonate | 0.2 | — | — | 4.0 | 4 | V-II |
| E | — | — | Potassium 2,4,5-trichlorobenzene sulfonate | 0.2 | 4.2 | 5 | V-II |
| F | Potassium benzenesulfonate | 0.1 | Potassium 2,4,5-trichlorobenzene sulfonate | 0.1 | 4.6 | 0 | V-O |
| G | Sodium naphthalene-1-sulfonate | 0.2 | — | — | 5.2 | 3 | V-II |
| H | Sodium naphthalene-1-sulfonate | 0.1 | Sodium pentachlorobenzene sulfonate | 0.1 | 4.6 | 0 | V-O |
| I | Sodium diphenyl-ether-4-sulfonate | 0.3 | — | — | 6.7 | 6 | V-II |
| J | — | — | Sodium 2,4,5-trichlorobenzene sulfonate | 0.2 | 3.4 | 5 | V-II |
| K | Sodium diphenyl-ether-4-sulfonate | 0.15 | Sodium 2,4,5-trichlorobenzene sulfonate | 0.1 | 4.8 | 0 | V-O |
| L | Sodium benzene sulfonate | 0.1 | Sodium 2,4,5-trichlorobenzene sulfonate | 0.1 | 3.9 | 0 | V-O |
| M | Potassium benzenesulfonate | 0.1 | Sodium 2,4,5-trichlorobenzene sulfonate | 0.1 | 4.0 | 0 | V-O |
| N | Sodium diphenylsulfone-3-sulfonate | 0.2 | — | — | 7.2 | 5 | V-II |
| O | — | — | Potassium 4-bromobenzenesulfonate | 0.2 | 3.6 | 5 | V-II |
| P | Sodium diphenylsulfone-3-sulfonate | 0.1 | Potassium 4-bromobenzenesulfonate | 0.05 | 3.6 | 0 | V-O |
| Q | Potassium naphthalene-2-sulfonate | 0.2 | — | — | 4.8 | 4 | V-II |
| R | — | — | Potassium trifluoromethane sulfonate | 0.2 | 3.6 | 1 | V-II |
| S | Potassium naphthalene-2-sulfonate | 0.1 | Potassium trifluoromethane sulfonate | 0.1 | 3.6 | 0 | V-O |
| T | Sodium toluene-4-sulfonate | 0.5 | — | — | 8.2 | 3 | V-II |
| U | — | — | Sodium 5-chlorothiophene-2-sulfonate | 0.2 | 3.8 | 4 | V-II |
| V | Sodium toluene-4-sulfonate | 0.1 | Sodium 5-chlorothiophene-2-sulfonate | 0.1 | 3.9 | 0 | V-O |
| W | Dipotassium diphenylsulfone-3,3'-disulfonate | 0.3 | — | — | 4.6 | 5 | V-II |
| X | Dipotassium diphenylsulfone-3,3'-disulfonate | 0.1 | Potassium 4-bromobenzene sulfonate | 0.1 | 4.2 | 0 | V-O |
| Y | Calcium biphenyl-4-sulfonate | 0.5 | — | — | 6.2 | 3 | V-II |
| Z | — | — | Sodium 2,3,4,5-pentachlorodiphenylsulfide-4'-sulfonate | 0.3 | 3.8 | 6 | V-O |
| A' | Calcium biphenyl-4-sulfonate | 0.2 | Sodium 2,3,4,5-pentachlorodiphenylsulfide-4'-sulfonate | 0.05 | 3.6 | 0 | V-O |
| B' | Polysodium polystyrenesylfonate | 0.4 | — | — | 6.6 | 3 | V-II |
| C' | — | — | Sodium p-iodobenzenesulfonate | 0.3 | 4.0 | 6 | V-II |
| D' | Polysodium polystyrenesulfonate | 0.1 | Sodium p-iodobenzenesulfonate | 0.1 | 5.6 | 0 | V-I |
| E' | Polysodium polystyrenesulfonate | 0.2 | Potassium 2,4,5-trichlorobenzene sulfonate | 0.05 | 4.8 | 0 | V-O |
| F' | Sodium diphenylsulfide-4-sulfonate | 0.2 | — | — | 6.6 | 4 | V-II |
| G' | — | — | Polypotassium(4-chlorostyrene)-poly-3-sulfonate | 0.3 | 4.2 | 3 | V-II |
| H' | Sodium diphenylsulfide-4-sulfonate | 0.1 | Polypotassium(4-chlorostyrene)-poly-3-sulfonate | 0.2 | 4.6 | 0 | V-O |
| I' | Sodium diphenylsulfide-4-sulfonate | 0.1 | Sodium 2,4,5-trichlorobenzenesulfonate | 0.1 | 4.0 | 0 | V-O |
| J' | Polysodium polystyrenesulfonate | 0.1 | Polypotassium poly-(4-chlorostyrene)- | 0.05 | 4.9 | 0 | V-O |

TABLE 1-continued

| Sample | Organic Salt Additive I | Amount (Parts per Hundred) | Organic Salt Additive II | Amount (Parts per Hundred | Flame Out Time Sec. | No. of Drips Per five Test bars | UL-94 Rating |
|---|---|---|---|---|---|---|---|
| K' | Potassium benzene-sulfonate | 0.05 | poly-3-sulfonate Polypotassium poly-(4-chlorostyrene)-poly-3-sulfonate | 0.05 | 5.2 | 0 | V-I |

It will thus be seen that the objects set forth above among those made apparent from he preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. An improved flame retardant polycarbonate composition of a aromatic carbonate polymer in admixture with 0.01 to about 5.0 parts per hundred parts of the aromatic carbonate polymer of an additive selected from the group consisting of organic alkali metal salts, organic alkaline earth metal salts, and mixtures thereof, the improvement which comprises having, in admixture with the flame retardant aromatic carbonate polymer, 0.01 to about 5.0 parts per hundred parts of the aromatic carbonate polymer of an additive selected from the group consisting of halogenated organic alkali metal salts, halogenated organic alkaline earth metal salts of aromatic sulfonic acids, or mixtures thereof.

2. The composition of claim 1 wherein the organic alkali metal salt or alkaline earth metal salt is selected from the group consisting of:
   alkali metal salts nd alkaline earth metal salts of monomeric or polymeric aromatic sulfonic acids;
   alkali metal salts and alkaline earth metal salts of monomeric or polymeric aromatic sulfonesulfonic acids;
   alkali metal salts and alkaline earth metal salts of unsubstituted sulfonic acids of aromatic ketones;
   alkali metal salts and alkaline earth metal salts of sulfonic acids of aromatic sulfides;
   alkali metal salts and alkaline earth metal salts of either monomeric or polymeric aromatic either sulfonic acids;
   alkali metal salts and alkaline earth metal salts of either monomeric or polymeric aromatic aide sulfonic acids; and
   mixtures of these salts.

3. The composition of claim 2 wherein the metal salt is non-halogenated.

4. The composition of claim 2 wherein the metal salt is sodium benzenesulfonate.

5. The composition of claim 2 wherein the metal salt is potassium benzenesulfonate.

6. The composition of claim 2 wherein the metal salt is polysodium polystyrene sulfonate.

7. The composition of claim 1 wherein the halogenated organic alkali metal salt or alkaline earth metal salt is selected from the group consisting of:
   alkali metal and alkaline earth metal salts of either monomeric or polymeric halogenated aromatic sulfonic acids;
   alkali metal and alkaline earth metal salts of halogenated sulfonic acids of heterocyclic compounds wherein the heterocyclic compound is selected from the group consisting of five and six membered heterocyclic nuclei containing a hetero atom selected from the group consisting of nitrogen, oxygen and sulfur;
   alkali metal and alkaline earth metal salts of halogenated halocycloaliphatic aromatic sulfonic acids;
   alkali metal and alkaline earth metal salts of halogenated methanesulfonic acids;
   alkali metal and alkaline earth metal salts of halogenated non-aromatic carboxylic acids; and
   mixtures thereof wherein said substituent is selected from the group consisting of an electron withdrawing radical and mixtures thereof.

8. The composition of claim 7 wherein the metal salt is sodium 22,4,5-trichlorobenzene sulfonate.

9. The composition of claim 7 wherein the metal salt is potassium 2,4,5-trichlorobenzene sulfonate.

10. The composition of claim 7 wherein the metal salt is polypotassium (4-chlorostyrene)-poly-3-sulfonate.

* * * * *

UNITED STATES PATENT AND TRADEMARK OFFICE
CERTIFICATE OF CORRECTION

PATENT NO. : 4,104,253

DATED : August 1, 1978

INVENTOR(S) : Victor Mark

Page 1 of 2

It is certified that error appears in the above-identified patent and that said Letters Patent are hereby corrected as shown below:

Col. 1, line 19, "retardant" is misspelled.

, line 23, "manufactures" should be -- manufacturers --

Col. 5, line 34, "triethylamine" is misspelled

, line 59, "carboxyl" is misspelled

Col. 6, line 2, "derivatives" is misspelled

, line 33, "1/8-1/8" should be -- 1/16-1/8 --

Claim 2, line 4, "and" is misspelled

, line 14, "either" (second occurrence) should be -- ether --

, line 17, "aide" should be -- amide --

UNITED STATES PATENT AND TRADEMARK OFFICE
CERTIFICATE OF CORRECTION

PATENT NO. : 4,104,253
DATED : August 1, 1978
INVENTOR(S) : Victor Mark

It is certified that error appears in the above-identified patent and that said Letters Patent are hereby corrected as shown below:

Claim 8, line 2, "22,4,5" should be -- 2,4,5 --

Signed and Sealed this

Twentieth Day of February 1979

[SEAL]

Attest:

RUTH C. MASON
*Attesting Officer*

DONALD W. BANNER
*Commissioner of Patents and Trademarks*